(12) United States Patent
Licon

(10) Patent No.: US 8,336,654 B1
(45) Date of Patent: Dec. 25, 2012

(54) POWER DEVICE FOR PALLET TRUCKS

(76) Inventor: Robert C. Licon, Covina, CA (US)

( * ) Notice: Subject to any disclaimer, the term of this patent is extended or adjusted under 35 U.S.C. 154(b) by 629 days.

(21) Appl. No.: 12/580,135

(22) Filed: Oct. 15, 2009

(51) Int. Cl.
*B60K 1/00* (2006.01)

(52) U.S. Cl. .................. 180/65.6; 180/65.1; 280/43.12

(58) Field of Classification Search ............. 180/65.6; 280/47.34, 47.35, 79.11
See application file for complete search history.

(56) References Cited

U.S. PATENT DOCUMENTS

| | | | | |
|---|---|---|---|---|
| 2,592,091 A | * | 4/1952 | Weaver | 180/214 |
| 2,601,171 A | * | 6/1952 | Schreck | 280/47.11 |
| 3,982,767 A | * | 9/1976 | Larsson et al. | 280/43.12 |
| 4,065,012 A | | 12/1977 | Rocco | |
| 4,287,959 A | * | 9/1981 | Inman | 180/12 |
| 4,615,533 A | * | 10/1986 | Sewell | 280/43.12 |
| 4,807,716 A | * | 2/1989 | Hawkins | 180/65.1 |
| 4,997,195 A | * | 3/1991 | Lee | 280/43.12 |
| 5,245,144 A | * | 9/1993 | Stammen | 200/61.85 |
| 5,513,940 A | * | 5/1996 | Florentin et al. | 414/458 |
| 6,260,646 B1 | * | 7/2001 | Fernandez et al. | 180/65.6 |
| D447,612 S | | 9/2001 | Niebuhr | |
| 6,907,949 B1 | * | 6/2005 | Wang | 180/65.51 |
| 7,040,427 B2 | * | 5/2006 | Toomey | 180/19.2 |
| 7,543,827 B2 | * | 6/2009 | Mantsinen | 280/43.12 |
| 7,641,011 B2 | * | 1/2010 | Fridlington et al. | 180/68.5 |
| 7,644,806 B2 | * | 1/2010 | Huther | 187/231 |
| 7,744,335 B1 | * | 6/2010 | Cleary | 414/664 |

\* cited by examiner

*Primary Examiner* — Hau Phan
*Assistant Examiner* — Jacob Meyer

(57) ABSTRACT

A power device for a pallet truck comprising a main housing comprising friction wheels disposed on sides of the main housing, wherein the main housing is attached to the pallet truck so that the friction wheels contact front wheels of the pallet truck; a motor housing comprising a motor operatively connected to the friction wheels and to a power source, wherein the motor is for rotating the friction wheels; a power switch for turning on and off the device operatively connected to the motor; wherein rotation of the friction wheels translates into movement of the front wheels of the pallet truck, wherein lack of rotation of the friction wheel translates into reduction of rotation of the front wheels of the pallet truck.

6 Claims, 5 Drawing Sheets

POWER DEVICE FOR PALLET TRUCKS

FIELD OF THE INVENTION

The present invention is directed to accessories for pallet trucks, more particularly to a power device for use with a pallet truck that also functions to reduce speed.

BACKGROUND OF THE INVENTION

Warehouses typically use pallets, flat transport structures, to support goods in a stable fashion. A pallet is often a wooded platform having a horizontal plate made of spaced boards. Special machinery is required to lift and move pallets. Such machinery (e.g., a fork-lift truck, a pallet truck) may comprise a fork having a pair of long arms that can be raised and lowered, wheels, and a means of propelling the machinery for carrying the pallet to another location. A pallet truck is designed for a user to walk behind the machinery, whereas a fork-lift truck is designed for the user to sit on the machinery. The present invention features a power device for pallet trucks.

It is believed that the power device of the present invention may reduce the effort required to move a pallet truck. Without wishing to limit the present invention to any theory or mechanism, it is believed that the power device of the present invention is advantageous because it can help to reduce the effort required to move a pallet truck. Using conventional means, a user must pull a pallet truck from a dead stop. Using the present invention, a user does not have to pull the pallet truck from a dead stop because the present invention provides power to the front wheel of the pallet truck. In addition, the device of the present invention can help reduce the speed of the pallet truck once in motion.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
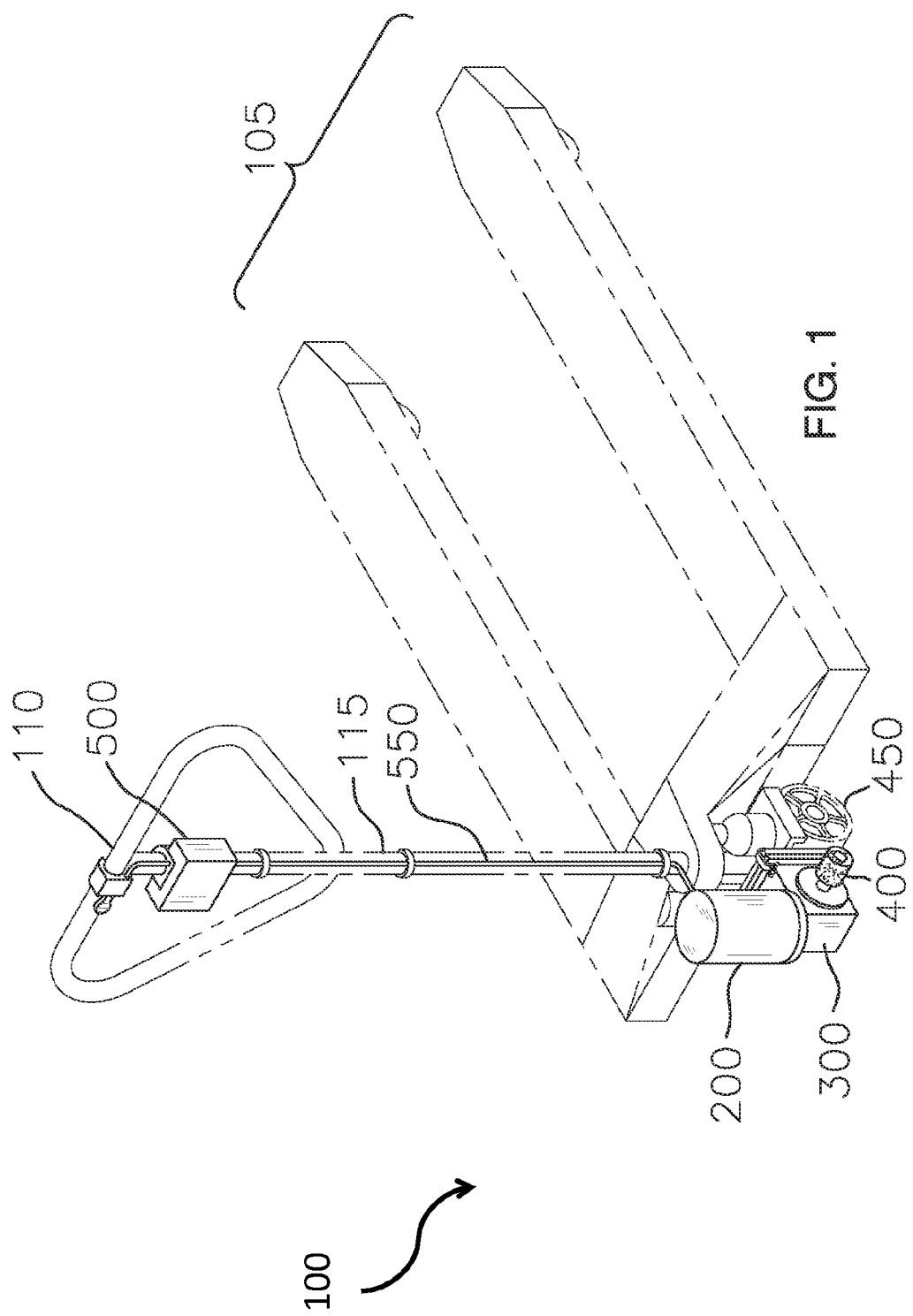
FIG. 1 is a perspective view of the power device of the present invention attached to a pallet truck.
Figure 2:
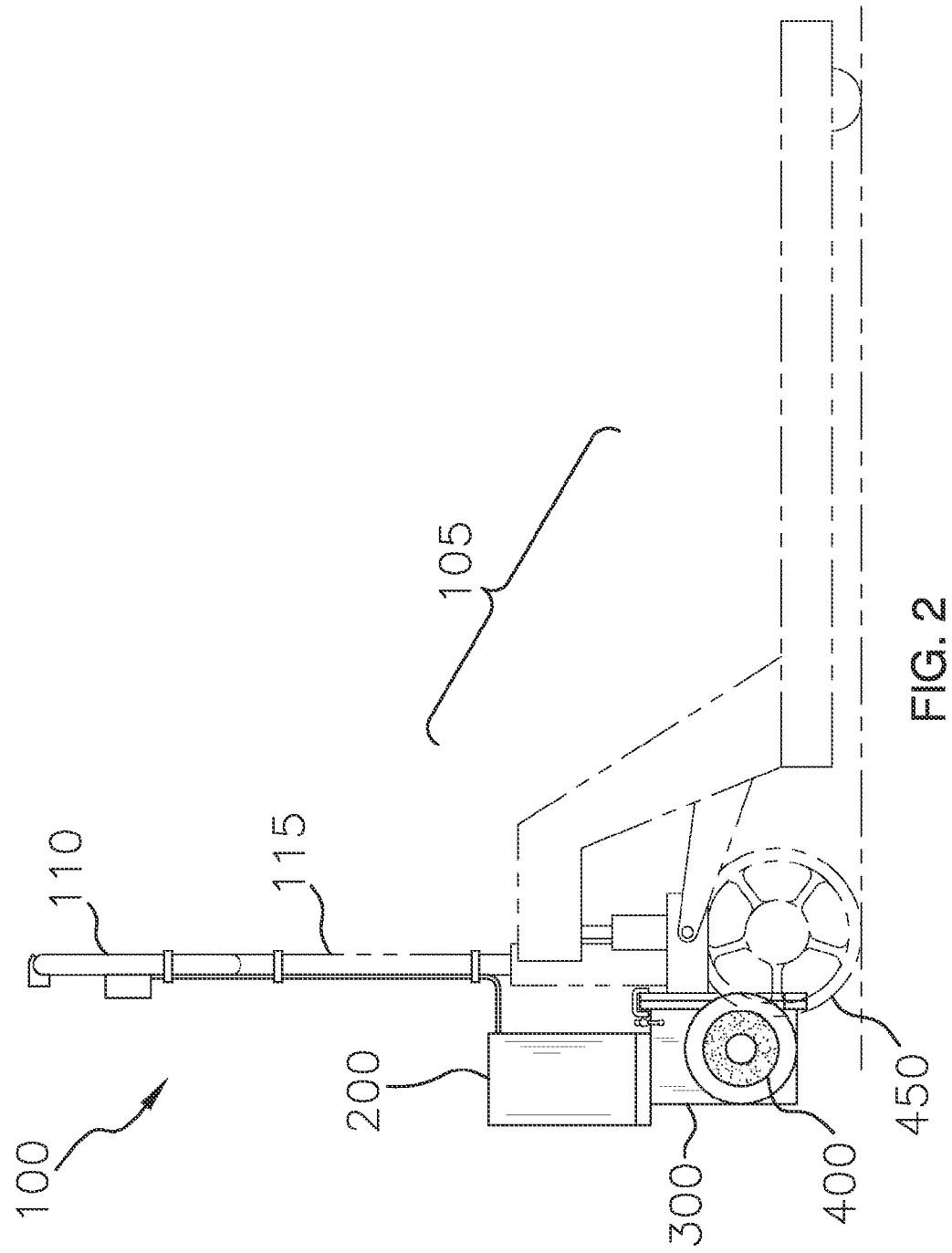
FIG. 2 is a side view of the power device of the present invention attached to a pallet truck.
Figure 3:
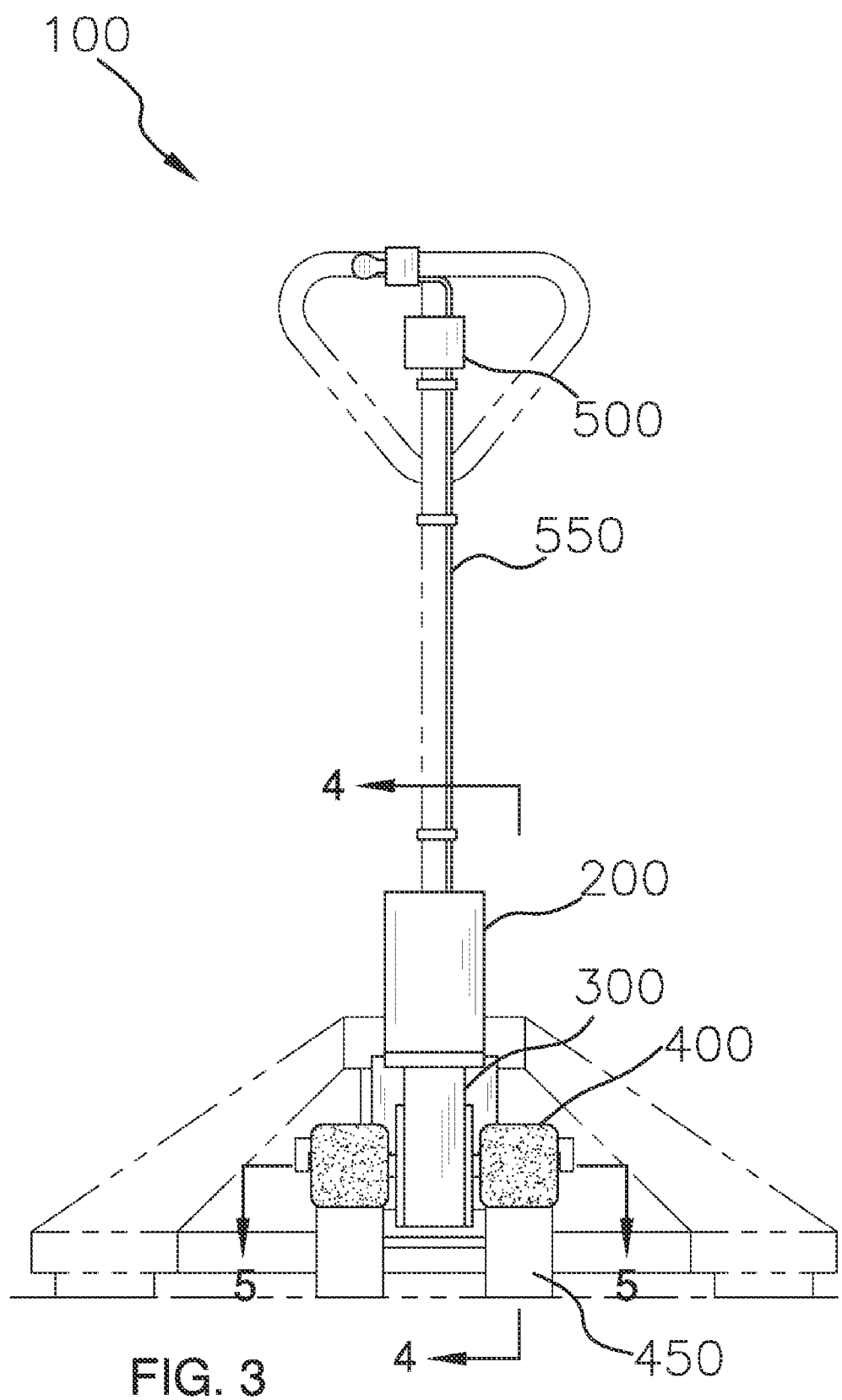
FIG. 3 is a front view of the power device of the present invention attached to a pallet truck.
Figure 4:
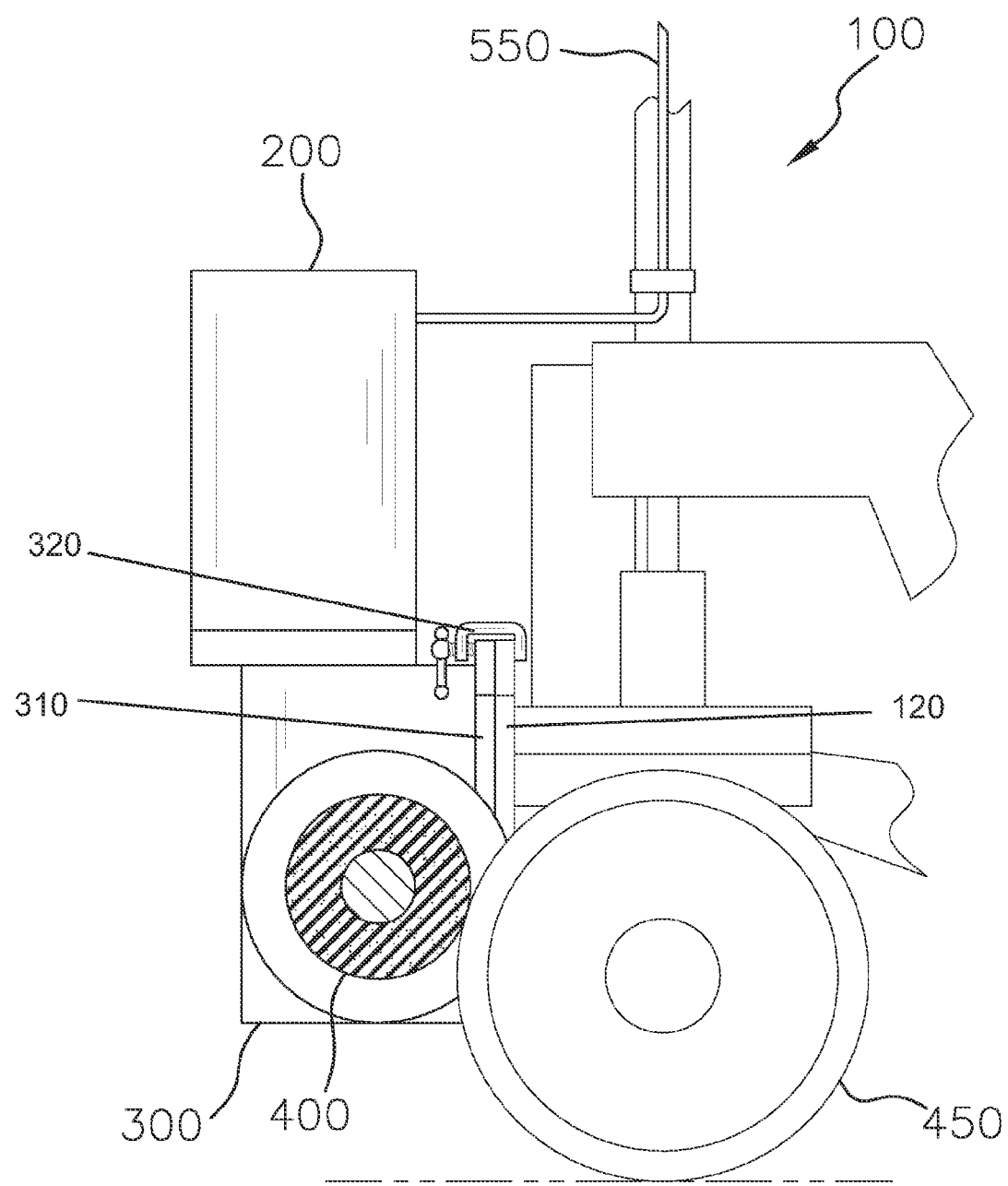
FIG. 4 is a side view of the power device of the present invention, wherein the main housing has a first flat plate 310 disposed between the first and second friction wheels, wherein the first flat plate 310 of the main housing is flushed with a second flat plate 120 of the pallet truck, wherein the main housing is temporarily attached to the pallet truck via a clamp 320 so that the first friction wheel and the second friction wheel contact front wheels of the pallet truck.
Figure 5:
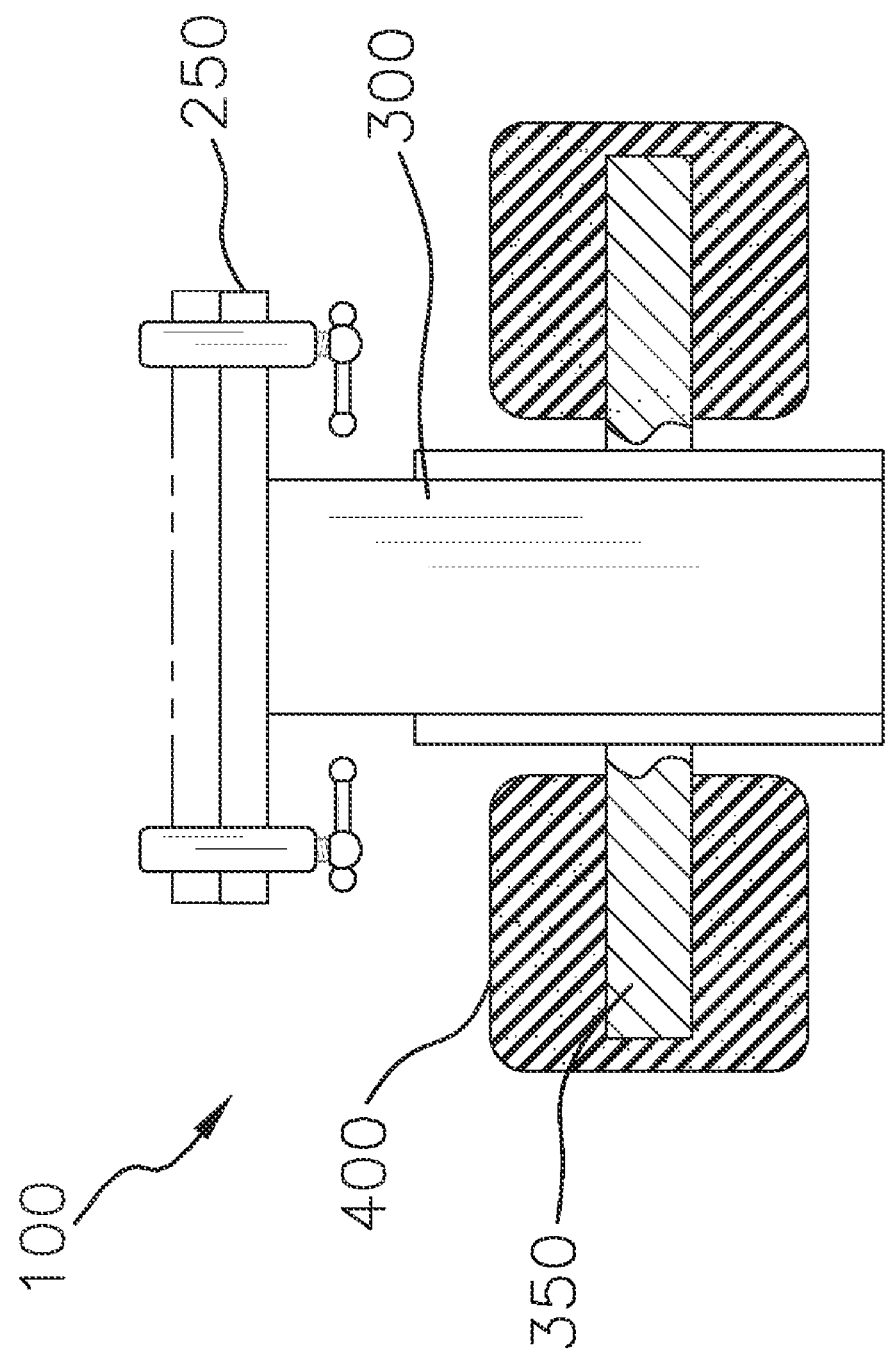
FIG. 5 is a cross sectional view of the power device of the present invention.

Referring now to FIGS. 1-5, the present invention features a power device 100 for attaching to a pallet truck 105 (e.g., front wheels 450). The power device 100 can help move the pallet truck 105 as well as help stop or reduce the speed of the pallet truck 105.

The power device 100 of the present invention comprises a main housing 300. The main housing 300 may have a first side, a second side, a top surface, a bottom surface, a front surface, and a back surface. The main housing 300 has a friction wheel 400 disposed on the first side and a friction wheel 400 disposed on the second side. A wheel axle 350 traverses the housing 300, for example from the first side to the second side. The friction wheels 400 are disposed on the ends of the wheel axle 350.

The wheel axle 350 is operatively connected to a motor disposed in a motor housing 200. The motor is for rotating the wheel axle 350 and the friction wheels 400. In some embodiments, the motor housing 200 is positioned atop the main housing 300.

The motor is operatively connected to a power source (e.g., a battery). The power source may be a rechargeable battery. In some embodiments, the power device 100 of the present invention comprises a power switch 500 for turning on and off the device 100 (e.g., the motor). In some embodiments, the power switch 500 is disposed on the handle 110 and/or on the handle shaft 115 of the pallet truck 105. The motor and/or power source may be operatively connected to the power switch via one or more wires 550.

The main housing 300 is attached to the pallet truck such that the friction wheels 400 come in contact with the pallet truck front wheels 450. Rotation of the friction wheels 400 (e.g., when the wheel axle is rotated by the motor) translates into movement (e.g., via friction) of the pallet truck front wheels 450. In some embodiments, the main housing 300 is attached to the shaft 115 of the pallet truck 105. In some embodiments, the main housing 300 and/or motor housing 200 are removably attached to the pallet truck via an attachment means 250. The attachment means 250 may includes a clamp mechanism, a hook mechanism, a snap mechanism, the like, or a combination thereof.

The friction wheels 400 on the main housing 300 also function to help reduce the speed of the pallet truck 105, for example via friction. The friction wheels 400 are in contact with the front wheels 450 of the pallet truck, and when the friction wheels 400 are stopped from rotating, friction causes the front wheels 450 to also stop or slow down.

The power device 100 of the present invention may be constructed in a variety of shapes and/or sizes to allow for its use on common makes and models of pallet jacks.

The disclosures of the following U.S. Patents are incorporated in their entirety by reference herein: U.S. Pat. No. 4,287,959; U.S. Pat. No. 4,065,012; U.S. Pat. No. 2,601,171; U.S. Pat. No. 6,907,949; U.S. Pat. No. 6,260,646.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A power device for a pallet truck, said power device comprising:
   (a) a main housing comprising a first friction wheel disposed on a first side of the main housing and a second friction wheel disposed on a second side of the main housing, wherein the main housing has a first flat plate disposed between the first and second friction wheels, wherein the first flat plate of the main housing is adaptable to be flushed with a second flat plate that is disposed between two front wheels of the pallet truck, wherein the main housing is temporarily attached to the pallet truck via a clamp that clamps the first flat late and the second flat together, wherein when the main housing is temporarily attached to the pallet truck the first friction wheel and the second friction wheel contact the two front wheels of the pallet truck;
   (b) a motor housing comprising a motor, wherein the motor is operatively connected to both the first friction wheel and the second friction wheel and to a power source, wherein the motor is for rotating both the first friction wheel and the second friction wheel, wherein the friction wheels have two operation modes, a rotation mode and a lack of rotation mode;
   (c) a power switch for turning on and off the power device, wherein the power switch is operatively connected to the motor;
   wherein rotation of the friction wheels translates into movement of the front wheels of the pallet truck, wherein lack of rotation of the friction wheels translates into reduction of rotation of the front wheels of the pallet truck.

2. The power device of claim 1, wherein a wheel axle traverses the main housing from the first side to the second side, wherein the first friction wheel is disposed on a first end of the wheel axle and the second friction wheel is disposed on a second end of the wheel axle.

3. The power device of claim 1, wherein the motor housing is positioned atop the main housing.

4. The power device of claim 1, wherein the power source is a rechargeable battery.

5. The power device of claim 1, wherein the power switch is mounted on the pallet truck.

6. A power device for a pallet truck, said power device consisting of:
   (a) a main housing comprising a first friction wheel disposed on a first side of the main housing and a second friction wheel disposed on a second side of the main housing, wherein the main housing has a first flat plate disposed between the first and second friction wheels, wherein the first fiat plate of the main housing is flushed with a second flat plate of the pallet truck, wherein the main housing is temporarily attached to the pallet truck via a clamp so that the first friction wheel and the second friction wheel contact front wheels of the pallet truck;
   (b) a motor housing comprising a motor, wherein the motor is operatively connected to both the first friction wheel and the second friction wheel and to a power source, wherein the motor is for rotating both the first friction wheel and the second friction wheel, wherein the friction wheels have two operation modes, a rotation mode and a lack of rotation mode;
   (c) a power switch for turning on and off the power device, wherein the power switch is operatively connected to the motor;
   wherein rotation of the friction wheels translates into movement of the front wheels of the pallet truck, wherein lack of rotation of the friction wheels translates into reduction of rotation of the front wheels of the pallet truck.

* * * * *